United States Patent [19]

Millard et al.

[11] Patent Number: 5,024,859
[45] Date of Patent: Jun. 18, 1991

[54] METHOD FOR APPLYING AN OXIDE BARRIER COATING TO A REINFORCING FIBER

[75] Inventors: Michael L. Millard, Sharonville; Michael G. Harrison, West Chester; Andrew Szweda, Middletown, all of Ohio

[73] Assignee: General Electric Company, Cincinnati, Ohio

[21] Appl. No.: 440,575

[22] Filed: Nov. 20, 1989

[51] Int. Cl.$^5$ .............................................. B05D 3/02
[52] U.S. Cl. ................................. 427/226; 427/443.2; 428/389; 428/902
[58] Field of Search ........................... 427/226, 443.2; 428/389, 902

[56] References Cited

U.S. PATENT DOCUMENTS

| | | | |
|---|---|---|---|
| 3,925,575 | 12/1975 | Church et al. | 427/226 |
| 3,926,604 | 12/1975 | Smay et al. | 65/60 |
| 4,376,803 | 3/1983 | Katzman | 428/408 |
| 4,492,722 | 1/1985 | Ritter et al. | 427/226 |
| 4,617,206 | 10/1986 | Haisma et al. | 427/374.1 |

OTHER PUBLICATIONS

"The Role of the Fiber-Matrix Interface in Ceramic Composites" by Ronald J. Kearans et al., *Ceramic Bulletin*, vol. 68, No. 2, 1989 pp. 429–442.

"Fiber Coating and Characterization" by David C. Cramer, *Ceramic Bulletin*, vol. 68, No. 2, 1989 pp. 415–419.

*Primary Examiner*—Norman Morgenstern
*Assistant Examiner*—Roy V. King
*Attorney, Agent, or Firm*—Jerome C. Squillaro; Carmen Santa Maria

[57] ABSTRACT

An oxide barrier coating for reinforcing fiber is provided with a preselected microstructure and thickness through control of the concentration of metal salt in heat decomposable form as a precursor of metal oxide. In one form, the salt is a metal oxyhalide salt such as zirconium oxyhalide or halfnium oxyhalide. Fibers, such as ones of alumina, aluminasilicate or silicon carbide, having the coating of the invention are especially useful as reinforcing fibers for reinforced ceramic matrix composites.

7 Claims, No Drawings

METHOD FOR APPLYING AN OXIDE BARRIER COATING TO A REINFORCING FIBER

This invention relates to oxide barrier coatings on fibers and, more particularly, to a coated fiber and method for applying an oxide barrier coating to a reinforcing fiber such as for reinforced ceramic matrix composites.

BACKGROUND OF THE INVENTION

Strength and toughness can be provided to composites through use of embedded reinforcing fibers. Such structures have been reported extensively in the patent and other literature. However, for composites planned for use in an oxidizing environment at temperatures greater than 1000° C., there are limited numbers of materials for the fiber and for the matrix in which the fiber is embedded. With various combinations of such materials, there are adverse events which can occur. For example, detrimental chemical interaction, oxidation or undesirable (i.e., too strong or too weak) bonding between the fiber and the matrix can reduce composite toughness and the effective and practical use of the composite.

Because the interface between a fiber and its surrounding matrix is important in reinforced composites, coatings have been proposed as a transition medium. A number of studies reported on this subject include "Fiber Coating and Characterization" by David C. Cranmer, CERAMIC BULLETIN, Vol 68, No 2, 1989, pages 415–419; and "The Role of the Fiber-Matrix Interface in Ceramic Composites" by Ronald J. Kerans et al, CERAMIC BULLETIN. Vol 68, No 2, 1989 pages 429–442. For the purpose of background and including herein an explanation of the mechanisms involved, the text of those articles are hereby incorporated herein by reference.

As discussed in those articles and elsewhere in the literature, attempts to control interface properties are now in their infancy. However, it has been observed that relatively weak interface layers can be beneficial, for example, in respect to the mechanism of fiber and/or matrix fracture. Having fiber reinforcements of higher strength and modulus than the matrix can increase properties of the composite if a load can be transferred properly from the matrix to the fiber. It is apparent that an interface coating, having a composition and microstructure which is preselected to be beneficial to the matrix-fiber combination, can provide improved strength and toughness to composites. This is especially important for use in an oxidizing environment at temperatures greater than 1000° C.: exposure to such temperatures increase the potential for fiber degradation as well as reaction between the materials in contact at the interface, for example fiber with coating and coating with matrix.

It has been observed that, in some cases, a relatively fine microstructure, referred to in such terms as crystalline, microcrystalline or crystalites, can provide such a beneficial coating structure. In other cases it is believed that a microstructure of relatively coarse interlocking crystals can be beneficial.

SUMMARY OF THE INVENTION

Briefly, in one form, the present invention provides a method for applying an oxide barrier coating to a reinforcing fiber, for example, a ceramic fiber, wherein the coating will have a preselected coating microstructure and thickness. Provided is a liquid including metal salt in a form which will decompose upon heating in a decomposition temperature range to metal oxide useful at greater than 1000° C. in an oxidizing environment, and which will not adversely react chemically with the reinforcing fiber. For example, when such salt is dissolved in water as the liquid or solvent, a metal hydroxide generally is provided. The concentration of the metal salt in the liquid is selected to provide the preselected coating microstructure. For example, a concentration, by weight, in the range of about 1% to less than about 15% provides a relatively fine oxide, generally non-crystalline or microcrystalline; a concentration, by weight, in the range of at least about 15%, for example up to about 20%, provides a coating microstructure of relatively coarse, interlocking oxide crystals.

The reinforcing fiber is wetted, preferably fully wetted, with the liquid, such as a coating solution, to apply a layer of a form of metal salt, for example the hydroxide, to the fiber. The layer thickness is selected to provide on the fiber, after decomposition heating, a coating of a thickness in the range of about 0.05–7% of the diameter of the fiber. Thereafter, the layer is heated in the decomposition temperature range to decompose the metal salt form to the metal oxide and to provide a reinforcing fiber having an oxide barrier coating of the preselected microstructure.

DESCRIPTION OF THE PREFERRED EMBODIMENTS

A variety of fiber coating techniques have been reported in the literature, for example in the above incorporated article "Fiber Coating and Characterization". Most commonly used are the described chemical vapor deposition (CVD), sol-gel deposition and polymer precursor deposition, as well as sputter coating. The latter applies a coating through removal of the coating species from a target by bombarding its surface with an ion beam. However, during evaluation of the present invention, it has been recognized that using such techniques as CVD or sputtering is impractical to deposit certain oxides found to be preferable fiber coating materials in the practice of the present invention. The method of the present invention is versatile, efficient and cost effective, enabling barrier coated fibers to be produced immediately after fiber production, as a separate coating operation or as a process in-line with a matrix impregnation or filament winding method.

As the literature has discussed, a ceramic matrix composite (CMC) incorporates ceramic reinforcements within a brittle ceramic matrix. In this way CMC's can be engineered with mechanisms which dissipate energy associated with a propagating crack front and provide the CMC with toughness. As discussed in the above incorporated article "The Role of the Fiber-Matrix Interface in Ceramic Composites", and elsewhere in the literature, energy dissipating mechanisms rely on decoupling of the fiber from the matrix as the crack front approaches the fiber. This requires that a weak bond exist at the fiber/matrix interface. The method of the present invention enables provision at the fiber/matrix interface of a coating having a composition and microstructure preselected as desirable for the particular fiber and matrix combination.

In a preferred form of the present invention, a metal salt or salts are selected for inclusion in the liquid, preferably a solution or a very fine slurry, as a precursor to provide a fiber coating of an oxide of Hf, Zr or their mixtures. For example $HfO_2$ and $ZrO_2$ have been recognized to have a low strength and modulus as fiber coatings. Even if bonded, this coating is believed to deflect an approaching crack front. Such oxides will undergo beneficial phase changes with changes in temperature especially above about 1000° C. Also, their volume will change with change in microstructure, resulting in a desirably "microcracked" coating after thermal cycling.

$ZrO_2$ and $HfO_2$ as fiber coatings have been found to be particularly beneficial for use at temperatures greater than 1000° C. because of their compatibility with $Al_2O_3$ fibers such as in the single crystal form of sapphire. As was mentioned before, the materials for fibers useful at greater than 1000° C. in CMC's is limited. Alumina as sapphire fiber is one reinforcement which is particularly attractive for such an application. However, its reaction with other oxide coating materials at temperatures above 1000° C. can be a serious problem. For example, reaction problems such as solid solutioning occur at such temperatures with such materials as oxides of Ce, Si and Y and as nitrides of B, Si and Al, sometimes suggested in the literature as fiber coatings. Other fiber materials include aluminosilicate and silicon carbide.

Metallic elements such as Hf and Zr can be provided, in a preferred form of the present invention, in the form of a soluble salt, such as metal oxyhalide salt. Typically, in the present invention, $HfO_2$ and $ZrO_2$ coatings have been applied to ceramic reinforcements using the hydrated oxychloride salt forms in aqueous solution from which the layer of a form of salt can be applied to a reinforcing fiber, for example a ceramic fiber. When such salts are dissolved in water, the hydroxide form is created. Forms soluble in other solvents, for example, organometallic salts, also are available. Decomposition heating of such a metal salt layer will result in a coating of metal oxide on the fiber surface.

According to the present invention, the microstructure of the oxide barrier coating is controlled by the concentration of metal salt in the liquid, such as the coating solution, applied to generate a layer on the fiber. For example, during evaluation of the present invention, it was recognized that when using zirconium oxychloride or hafnium oxychloride as the metal salt, crystallization of the oxide after drying did not begin to occur until greater than about a 10 wt % solution, for example up to near 15% solution, of the oxychloride salt was used and that at least about 1 wt % was required to provide a sufficiently adherent, uniform coating on the fiber surface. At 5 wt % concentration, discrete microcrystalline anhydrous oxides, for example of about 0.7 micron size, resulted in the coating. However above about 15 wt % concentration, the coating exhibited crystallization and, at about 20 wt %, dendrites or interlocking crystals of the oxide were present. Therefore, when using zirconium oxychloride, hafnium oxychloride or their mixtures in the practice of the present invention, if a relatively fine coating of discrete oxide material is found to be beneficial and is desired, a liquid including by weight about 1% to less than about 15% of the metal salt is used to provide the metal salt form layer prior to decomposition heating. If a relatively coarse coating of dendrites or interlocking crystals of oxide material is desired, a liquid including at least about 15 wt %, and preferably about 15–20 wt % of the metal salt is used. Selection of the character of the coating is based, at least in part, on the bond desired at the interface between the fiber and its matrix, as discussed above. The present invention enables the desired bond to be provided. Use of other metal salts may define other liquid ingredient limits to control and enable selection of the desired bond.

Fiber coating thickness also is an important consideration. In general, it is desirable to have a coating with minimum thickness which will still provide a transition medium and which will not dissolve at an intended use temperature. According to the present invention, it has been recognized that an oxide coating thickness of at least about 0.05% of the fiber diameter is required for a metal oxide to cover the fiber surface and to accomplish its intended task. However, at an oxide coating thickness of 7%, or greater, of the fiber diameter, the coating is too thick and begins to function as a matrix. According to the present invention, the thickness of the applied form of metal salt layer is selected to result in a metal oxide coating of a thickness in the range of about 0.05 to less than 7% of the fiber diameter. With a sapphire fiber, it has been observed that a concentration of oxyhalide salt of Zr or of Hf in aqueous solution be in the range of about 1 wt % to less than 15 wt % to result in a coating having at least about 50% fine, microcrystalline oxide material.

In the preparation of the coating liquid, as a solution or fine slurry of metal salt, it is convenient and practical to include a binder, such as an organic material commonly used in the art, of a type which will decompose substantially without adverse residue during decomposition heating of the metal salt. Examples of such binders used in evaluation of the present invention include methocellulose compound and polyvinyl alcohol. After drying of the applied layer, such as in air, the binder will hold the metal salt form, such as the hydroxide form, in place as the layer on the fiber prior to decomposition heating. In this form, the liquid includes a precursor of the metal oxide or combination of oxides, and an appropriate temporary organic binder.

A variety of high temperature fibers were evaluated in connection with this invention. These included the single crystal form of $Al_2O_3$ referred to as sapphire, the monofilament commercially available as Textron SCS-6 material, and aluminosilicate fibers commercially available as Sumitomo or Nextel. All such materials are suitable for use at least to 1000° C. without adverse change in mechanical properties.

EXAMPLE SET 1

In one set of specific examples, a series of liquids in the form of aqueous solutions of zirconium oxychloride salt, as the metal oxyhalide salt, were prepared in concentrations, by weight, of 1%, 5%, 10% and 20%. Included was the organic binder methocellulose at a concentration of about 1 wt %. Sapphire fibers of a diameter of about 150 microns were wetted with this liquid by passing the fibers through the liquid. After drying at about 30° C., a layer of zirconium oxyhydroxide and binder to a thickness of about 1 micron resulted. In this example, the treated fiber was then heated in air at about 600° C., to satisfy a decomposition temperature range of about 50°–500° C., at which complete decomposition occurred. The salt form decomposed to $ZrO_2$ at a coating thickness of about 0.01–2.5 microns.

EXAMPLE SET 2

Example Set 1 was repeated except that hafnium oxychloride salt was used as the metal oxyhalide salt.

Resulting from Example Sets 1 and 2 were a series of oxide coated sapphire fibers with the following characteristics:

TABLE

| Salt Concentration | Oxide Coating Microstructure |
| --- | --- |
| 1% | thin, adherent, fine grained, microcrystalline |
| 5% | 0.7 micron thick, microcrystalline |
| 10% | thicker and crystallization starting |
| 15% | more extensive crystallization |
| 20% | interlocking crystals or dendrites |

From these typical examples, it can be seen that the present invention provides a method for applying to a fiber, or plurality of fibers, an oxide barrier coating having a microstructure preselected for an intended application and matrix. In its more specific form, the invention defines a coating uniquely compatible and non-reactive with $Al_2O_3$ fibers, for example in the form of the single crystal sapphire, at temperatures at least of 1000° C.

Presented here have been certain typical, representative data, examples and embodiments of the present invention. However, it should be understood by those skilled in the art that the present invention is not intended to be limited by them but is capable of other forms within the scope of the appended claims.

We claim:

1. A method for applying an oxide barrier coating to a reinforcing fiber having a predetermined fiber diameter to provide the coating with a preselected coating microstructure and thickness, comprising the steps of:
   (a) providing an aqueous solution including a concentration of a metal oxyhalide salt selected from the group consisting of zirconium oxyhalide, hafnium oxyhalide and mixtures thereof, the concentration of the metal salt in water being selected to provide the preselected coating microstructure;
   (b) wetting the reinforcing fiber with the aqueous solution to apply a layer of the metal salt to the reinforcing fiber, which metal salt will decompose, upon heating in a predetermined decomposition temperature range, to a metal oxide which will not adversely react chemically with the reinforcing fiber at an intended operating temperature greater than 1000° C. in an oxidizing atmosphere wherein the thickness of the layer is selected to provide on the fiber, after heating in the decomposition temperature range, a coating of the metal oxide of a thickness in the range of about 0.05% to less than 7% of the fiber diameter; and subsequently
   (c) heating the layer in the decomposition temperature range to decompose the metal salt to the metal oxide and to provide on the reinforcing fiber the oxide barrier coating with the preselected coating microstructure and coating thickness.

2. The method of claim 1 in which the metal oxyhalide salt is hydrated zirconium oxychloride.

3. The method of claim 1 in which the metal oxyhalide salt is hydrated hafnium oxychloride.

4. A method for applying an oxide barrier coating to a ceramic reinforcing fiber having a predetermined fiber diameter and capable of exposure to an oxidizing atmosphere at greater than 1000° C. without substantial adverse change in fiber mechanical properties to provide the coating with a preselected coating microstructure and thickness, comprising the steps of:
   (a) providing a liquid including a concentration of a metal salt selected from the group consisting of zirconium oxyhalide, hafnium oxyhalide and mixtures thereof, which will decompose upon heating in a predetermined decomposition temperature range to a metal oxide which will not adversely react chemically with the ceramic reinforcing fiber at greater than 1000° C. in an oxidizing atmosphere, wherein the concentration of the metal salt in the liquid being selected to provide the preselected coating microstructure;
   (b) contacting the ceramic reinforcing fiber with the liquid to apply a layer of the metal salt to the reinforcing fiber, the thickness of the layer being selected to provide on the fiber, after heating in the decomposition temperature range, a coating of the metal oxide of a thickness in the range of about 0.05% to less than 7% of the fiber diameter; and subsequently,
   (c) heating the layer in the decomposition temperature range to decompose the metal salt to the metal oxide and to provide on the reinforcing fiber the oxide barrier coating with the preselected coating microstructure and coating thickness.

5. The method of claim 4 in which the liquid is a solution of metal oxyhalide salt in a solvent for said salt.

6. The method of claim 4 in which the metal oxyhalide salt is hydrated zirconium oxychloride.

7. The method of claim 4 in which the metal oxyhalide salt is hydrated hafnium oxychloride.

* * * * *